H. R. EDGECOMB.
BOND DISTRIBUTER FOR MICA TOWERS.
APPLICATION FILED FEB. 19, 1914.
1,126,161.
Patented Jan. 26, 1915.
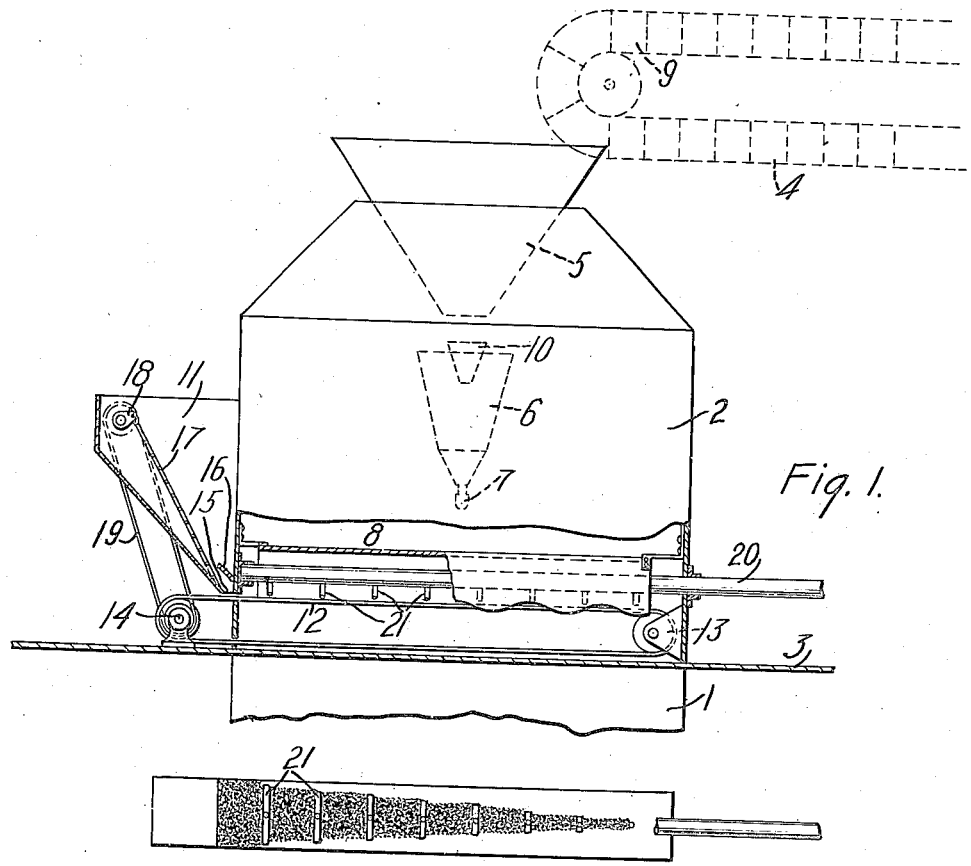
Fig. 1.
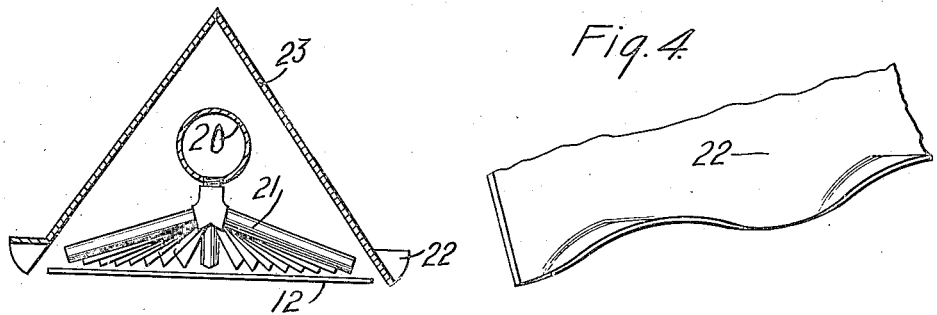
Fig. 2.
Fig. 3.
Fig. 4.
WITNESSES:
Fred A. Lind.
Geo. W. Hansen.
INVENTOR
Henry R. Edgecomb
BY
Wesley G. Carr
ATTORNEY

UNITED STATES PATENT OFFICE.

HENRY R. EDGECOMB, OF WILKINSBURG, PENNSYLVANIA, ASSIGNOR TO WESTINGHOUSE ELECTRIC AND MANUFACTURING COMPANY, A CORPORATION OF PENNSYLVANIA.

BOND-DISTRIBUTER FOR MICA-TOWERS.

1,126,161.

Specification of Letters Patent. Patented Jan. 26, 1915.

Application filed February 19, 1914. Serial No. 819,726.

*To all whom it may concern:*

Be it known that I, HENRY R. EDGECOMB, a citizen of the United States, and a resident of Wilkinsburg, in the county of Allegheny and State of Pennsylvania, have invented a new and useful Improvement in Bond-Distributers for Mica-Towers, of which the following is a specification.

My invention relates to the manufacture of insulating sheets composed of mica flakes and a binding material or bond, and it has particular reference to means for continuously and uniformly distributing powdered bond over the mica flakes which are deposited upon a plate or receiving surface located at the bottom of a tower.

My invention relates more particularly to mica building machines of the type set forth in Patent No. 1,074,576 in which the bond distributers are cylindrical sieves that extend completely across the towers and roll upon oscillating frames to insure proper distribution of the bond. In a machine of this character, the sieve must be taken out and recharged after each mica plate is formed. Consequently, the machine is idle a large portion of the time because of the delay in recharging the bond distributer.

The object of my invention is to provide an efficient means for continuously and uniformly distributing the bond in a powdered form over the mica flakes which are deposited upon a receiving frame or templet at the bottom of the tower.

Figure 1 of the accompanying drawing is a view, partially in section and partially in elevation, of a machine constructed in accordance with my invention; Fig. 2 is a plan view of a portion of my bond distributer showing a continuously movable belt and the location of the nozzles that direct air jets thereupon; Fig. 3 is an end view, partially in section, of my bond distributer, and Fig. 4 is a side view of a portion of the deflector which insures a uniform distribution of the bond.

Referring to the drawings, the structure shown comprises a tower 1 having a top portion 2 which is preferably located above the floor line 3 of a balcony or platform and is provided with a conveyer 4, a receiving hopper 5, a distributing hopper 6, an ejector 7, and a bond distributing mechanism 8 which embodies my invention. The conveyer 4 comprises an endless belt or chain having a plurality of pockets or buckets 9 to which measured quantities of mica flakes may be supplied. The contents of the pockets are successively emptied into the receiving hopper 5 which is disposed above a deflector 10. The discharging hopper 6 is directly below the outlet of the receiving hopper 5, the deflector 10 being located in its mouth. The ejector 7 is located in the bottom of the hopper 6, the arrangement of parts being such that mica flakes, falling from the hopper 5 into the hopper 6, are forced upwardly and outwardly therefrom into the tower when compressed air is discharged through the ejector 7, the deflector 10 serving to prevent the flakes from returning into the hopper 5. The dry powdered bond is deposited in a hopper 11 secured to the outer wall of the portion 2 of the tower. An endless belt 12, extending entirely across the tower and engaging a revoluble pulley 13 located upon the opposite wall of the extension 2, is continuously operated by a motor 14. Powdered bond is fed to the moving belt 12 through a rectangular slot 15 formed in the bottom of the hopper 11, the amount of bond passing through the slot being regulated by an adjustable shutter 16. The belt 12 is so driven that the bond deposited upon its upper face is fed forward into the tower. It is desirable to provide an agitator 17 within the hopper 11 in order to preclude the clogging of the bond at the outlet 15. In order to actuate the agitator 17, I provide an eccentric 18 which derives power from the motor 14 by means of a belted connection 19.

Centrally disposed over the belt 12 is a pipe 20 that is closed at one end and is provided with a plurality of pairs of variously diverging and downwardly extending nozzles 21. The pipe 20 is connected to a supply of compressed air which is regulated by any well known means in order to provide proper pressure for the air jets emitted from the nozzles 21. As shown in Fig. 2, the nozzles 21 are so arranged that the air jets emitted from the first pair of nozzles remove only the outer edges of the bond layer, while the air jets from the succeeding nozzles remove successive portions of the bond layer as the belt advances forward until the last jet completely cleans the bond from the belt.

In Fig. 3 is shown the arrangement of the nozzles 21 in combination with the supply pipe 20 and the belt 12, whereby portions of the bond are successively removed from the belt, thus insuring that the portions of the mica tower that are remote from the hopper 11 shall be adequately supplied with bond.

To preclude accumulations of the bond upon portions of the templet or receiving surface (not shown) located in the bottom of the tower, deflecting plates 22 are provided to effect uniform distribution of the powdered bond over the entire exposed area of the templet. The deflectors 22 are made so as to have a succession of warped or waved surfaces, as indicated in Fig. 4. The bond directed upon the different portions of the deflectors is projected outwardly and downwardly so that a uniform distribution thereof is effected upon the mica flakes at the bottom of the tower. A V-shaped shield 23, which is disposed above the bond distributer 8, prevents the accumulation thereupon of mica flakes ejected from hopper 6 and also provides supporting means for the deflectors 22.

From the above description, it will be apparent that a continuous shower of bond is provided under such conditions that large composite insulating sheets of mica and bond may be successively formed without necessitating the shutting down of the mica building machine. The product of my machine is of uniform excellence and thickness because of the uniform distribution of the powder bond upon the mica flakes.

Structural modifications may be effected within the spirit and scope of my invention, and the invention may be utilized for manipulating other materials than those specifically mentioned.

I claim as my invention:

1. A device for distributing a powdered material over a limited area, which comprises a movable belt, means for depositing the powdered material thereupon, and diverging nozzles adapted to emit air jets which are projected upon the belt to force the powdered bond therefrom.

2. A device for distributing a powdered material which comprises a movable belt, means for depositing the powdered material thereupon, and pairs of diverging and downwardly extending nozzles disposed above the belt, said nozzles being so arranged as to emit air jets that remove successive portions of the powdered bond from the belt.

3. A device for distributing a powdered material which comprises a movable belt, means for continuously depositing a uniform layer of powdered material thereupon, and pairs of variously diverging nozzles adapted to emit oppositely directed air jets upon the belt to force the powdered bond therefrom.

4. A device for distributing a powdered material which comprises a movable belt, means for depositing the powdered material thereupon, and a plurality of pairs of diverging air nozzles disposed above the belt, the divergence of the air nozzles varying so as to remove successive portions of the powdered material from the belt.

5. A device for distributing a powdered material which comprises a movable belt, means for depositing a uniform layer of powdered material thereupon, and pairs of decreasingly diverging air nozzles centrally so disposed above the belt that successive portions of the powdered material are removed by the air jets as the belt travels under the nozzles.

6. A device for uniformly distributing a powdered material which comprises a movable belt, means for depositing the powdered material thereupon, air nozzles adapted to emit air jets upon the belt, and a deflector against which the powdered material is projected to effect a substantially uniform distribution thereof upon a receiving surface.

7. A device for uniformly distributing a powdered material which comprises a movable belt, means for depositing a uniform layer of powdered material thereupon, pairs of variously diverging nozzles adapted to emit oppositely directed air jets upon the belt, and longitudinally disposed deflectors having a succession of warped or waved surfaces against which the powdered material is projected to effect a substantially uniform distribution thereof upon a receiving surface.

8. The combination with a mica building tower, of a bond distributer therefor comprising a movable belt that extends substantially across the tower, means for depositing the bond thereupon, air nozzles adapted to emit air jets upon the belt, and deflectors against which the powdered material is projected to effect a uniform distribution thereof on a receiving surface.

9. The combination with a mica building tower, of a device for uniformly distributing a powdered bond which comprises a movable belt that extends substantially across the tower, means for depositing a uniform layer of powdered material thereupon, pairs of variously diverging nozzles adapted to emit air jets upon the belt, and longitudinally disposed deflectors to effect a substantially uniform distribution of the powdered bond on a receiving surface.

10. The combination with a mica building tower, of a bond distributer therefor comprising a containing hopper, a belt adapted to travel beneath the hopper and extending substantially across the tower, means for depositing bond upon the belt, air nozzles adapted to emit air jets upon the belt, and deflectors against which the powdered material is projected to effect a uniform distribution thereof on a receiving surface disposed within the tower.

In testimony whereof, I have hereunto subscribed my name this 13th day of Feb. 1914.

HENRY R. EDGECOMB.

Witnesses:
O. W. A. OETTING,
B. B. HINES.